United States Patent [19]

DeBourke

[11] Patent Number: 4,934,537
[45] Date of Patent: Jun. 19, 1990

[54] FISH SORTING APPARATUS AND METHOD

[75] Inventor: Patrick J. DeBourke, St. John's, Canada

[73] Assignee: Grove Telecommunications Ltd., St. John's, Canada

[21] Appl. No.: 302,656

[22] Filed: Jan. 27, 1989

[30] Foreign Application Priority Data

Jan. 28, 1988 [CA] Canada ............................. 557586

[51] Int. Cl.⁵ .............................................. B07C 5/02
[52] U.S. Cl. .................................... 209/588; 198/367;
198/368; 209/657; 209/698; 209/914; 209/934; 209/939
[58] Field of Search ............... 209/539, 576, 577, 587,
209/588, 586, 598, 656, 657, 698, 939, 922, 914,
934; 198/367, 369, 435

[56] References Cited

U.S. PATENT DOCUMENTS

| | | | |
|---|---|---|---|
| 3,150,775 | 9/1964 | Barrett | 209/703 |
| 3,416,659 | 12/1968 | Linderman et al. | 11/111.7 |
| 3,580,141 | 3/1971 | Richter | 198/435 X |
| 3,812,964 | 5/1974 | Woodruff | 209/586 X |
| 3,857,488 | 12/1974 | LeCren | 209/657 X |
| 4,136,781 | 1/1979 | Perry et al. | 209/934 X |
| 4,244,475 | 1/1981 | Green | 11/588 |
| 4,279,346 | 7/1981 | McClure et al. | 209/588 X |
| 4,572,666 | 2/1986 | Satake | 356/239 |
| 4,576,482 | 3/1986 | Pryor | 209/586 X |
| 4,682,695 | 7/1987 | Hasebalg | 209/571 |
| 4,706,336 | 11/1987 | Hartmann et al. | 209/938 X |

FOREIGN PATENT DOCUMENTS

| | | | |
|---|---|---|---|
| 750218 | 1/1967 | Canada. | |
| 862587 | 2/1971 | Canada. | |
| 1039224 | 9/1978 | Canada. | |
| 1039235 | 9/1978 | Canada. | |
| 1042105 | 11/1978 | Canada. | |
| 1110996 | 10/1981 | Canada. | |
| 1125410 | 6/1982 | Canada. | |
| 1131785 | 9/1982 | Canada. | |
| 1159955 | 1/1984 | Canada. | |
| 1037569 | 9/1953 | France | 198/435 |
| 659274 | 2/1965 | France | 209/588 |
| 165620 | 12/1981 | Japan | 198/367 |
| 497993 | 4/1976 | U.S.S.R. | 209/586 |
| 1193852 | 3/1967 | United Kingdom | 198/367 |
| 1505073 | 3/1978 | United Kingdom | 209/586 |

Primary Examiner—Donald T. Hajec
Attorney, Agent, or Firm—Sughrue, Mion, Zinn, Macpeak & Seas

[57] ABSTRACT

Fish sorting apparatus comprises a lighted viewing conveyor belt arranged to receive fish seriatim and a video camera mounted above the viewing belt and directed downwardly for receiving images of fish on the belt. A second, sorting, conveyor belt is arranged to receive fish from the viewing belt, and a divider wall above the sorting conveyor belt, which extends parallel to the sorting conveyor belt axis, divides a rear exit portion thereof into separate channels. A movable deflector is mounted in front of the divider wall for deflecting fish on the sorting conveyor belt into one of the channels, this deflector being moved in response to signals from an electronic circuit connected to the video camera so that the fish are deflected into one or other of the channels according to the image received on the video camera. The deflector forms an angle of less than 45 degrees with the divider wall, the whole apparatus being arranged so that the fish are sorted into separate receivers without substantial re-orientation or abrupt path changes. Other special features of the apparatus include the use of a translucent conveyor belt as the viewing belt, and the use of driven outlet conveyor belts leading from the end of each channel and which can be moved into several different positions for feeding the fish into vertically separated receivers.

10 Claims, 4 Drawing Sheets ic Limited. However, previously know apparatus did
FISH SORTING APPARATUS AND METHOD

INTRODUCTION

The present invention provides fish sorting apparatus capable of receiving a continuous supply of fish of mixed species and/or size and of sorting these into categories according to desired charaterics. The preferred embodiment of the invention can sort the fish into eight such categories.

PRIOR ART

Fish sorting apparatus is known per se, and examples of such apparatus are described in Canadian Pat. Nos. 1,039,224 and 1,039,235, issued Sept. 26, 1978, and No. 1,125,410 issued June 8th 1982, all to Neptune Dynamics Limited. However, previously know apparatus did not have the ability to sort fish accurately into many categories according to size and/or species, as is possible with the present invention. Also, some known apparatus, if operated at high speed, can damage the fish since it involves abrupt changes in direction or sudden re-orientations of the fish. The present invention can be operated at high speed without substantial damage to fish since the direction of movement and orientation of the fish remains generally constant and abrupt changes are avoided.

SUMMARY OF THE INVENTION

In accordance with the present invention, fish sorting apparatus comprises a lighted viewing conveyor belt arranged to receive fish seriatim, and a video camera mounted above the viewing belt and directed downwardly to receive images of individual fish thereon. A sorting conveyor belt is arranged to receive fish from the viewing belt, and a divider wall is provided above the sorting conveyor belt extending parallel to its axis and which divides a rear, exit portion thereof into separate channels. Moveable deflector means are mounted in front of the divider wall for deflecting fish on the sorting conveyor belt into one of the channels, the deflector means being arranged to strike the fish at an oblique angle to avoid damage to the fish. Actuator means are provided for moving the deflector means between its two extreme positions, and electronic circuit means connect the actuator means to the video camera so that the deflector is positioned to deflect fish into a specific channel according to the image of the fish received by the video camera when that fish was on the viewing conveyor belt. Preferably, the deflector means forms an angle of less than 45 degrees with the divider wall in both of its extreme positions.

Each of the channels may communicate with a separate outlet conveyor belt, and each outlet conveyor belt may be pivotable about a horizontal axis at its inlet end and have actuating means for moving it between several different positions to deliver fish from each channel into receiving means at different levels, the actuating means being also controlled by the electronic circuit means connected to the video camera.

Each outlet conveyor belt may be capable of directing fish into receiving means at four different levels. For this purpose, its actuating means may include two fluid operated cylinders mounted in series, the cylinders having different strokes so that each outlet conveyor belt can be moved between a first position by retraction of both cylinders, second and third positions by extension of one of the cylinders and retraction of the other, and a fourth position by an extension of both cylinders.

Preferably, the viewing conveyor belt and the video camera are mounted together on a frame which is isolated from another frame carrying the sorting conveyor belt, and actuating means such as fluid cylinders associated therewith, to prevent vibrations caused by the actuating means from reaching the camera.

An infeed conveyor may be provided to feed fish onto the viewing conveyor belt. Preferably, the viewing conveyor belt is driven at a faster speed than the infeed conveyor, so that fish placed manually on the infeed conveyor become more separated as they pass onto the viewing conveyor. Preferably, also, each side of the infeed conveyor belt is accessible by an operator so that two operators can simultaneously place fish onto opposite sides of the infeed belt so that the fish can pass on separate rows along the viewing conveyor belt, both of said rows being in view of the camera. The circuit means for the video camera is arranged to monitor both of the rows of fish on the viewing conveyor and to control sorting means on the sorting conveyor for each row of fish.

The invention further comprises a process for the sorting of fish wherein fish are fed seriatim onto a viewing conveyor belt and an image of each fish is obtained by a video camera while it is on the viewing conveyor belt, and wherein the fish are passed from the viewing conveyor belt onto a sorting conveyor belt, and wherein the fish are deflected between separate parallel channels while on the sorting belt by deflecting means inclined at an angle of less than 45 degrees to the path of movement of the fish, the deflecting means being operated by circuit means connected to the video camera so that fish are deflected into separate channels according to their pre-selected charateristics as registered by the camera, the fish being directed into the channels without substantial re-orientation or abrupt path changes.

BRIEF DESCRIPTION OF THE DRAWINGS

The invention will be described in further detail with reference to the accompanying drawings showing a preferred embodiment, and wherein.

DETAILED DESCRIPTION

Figure 1:
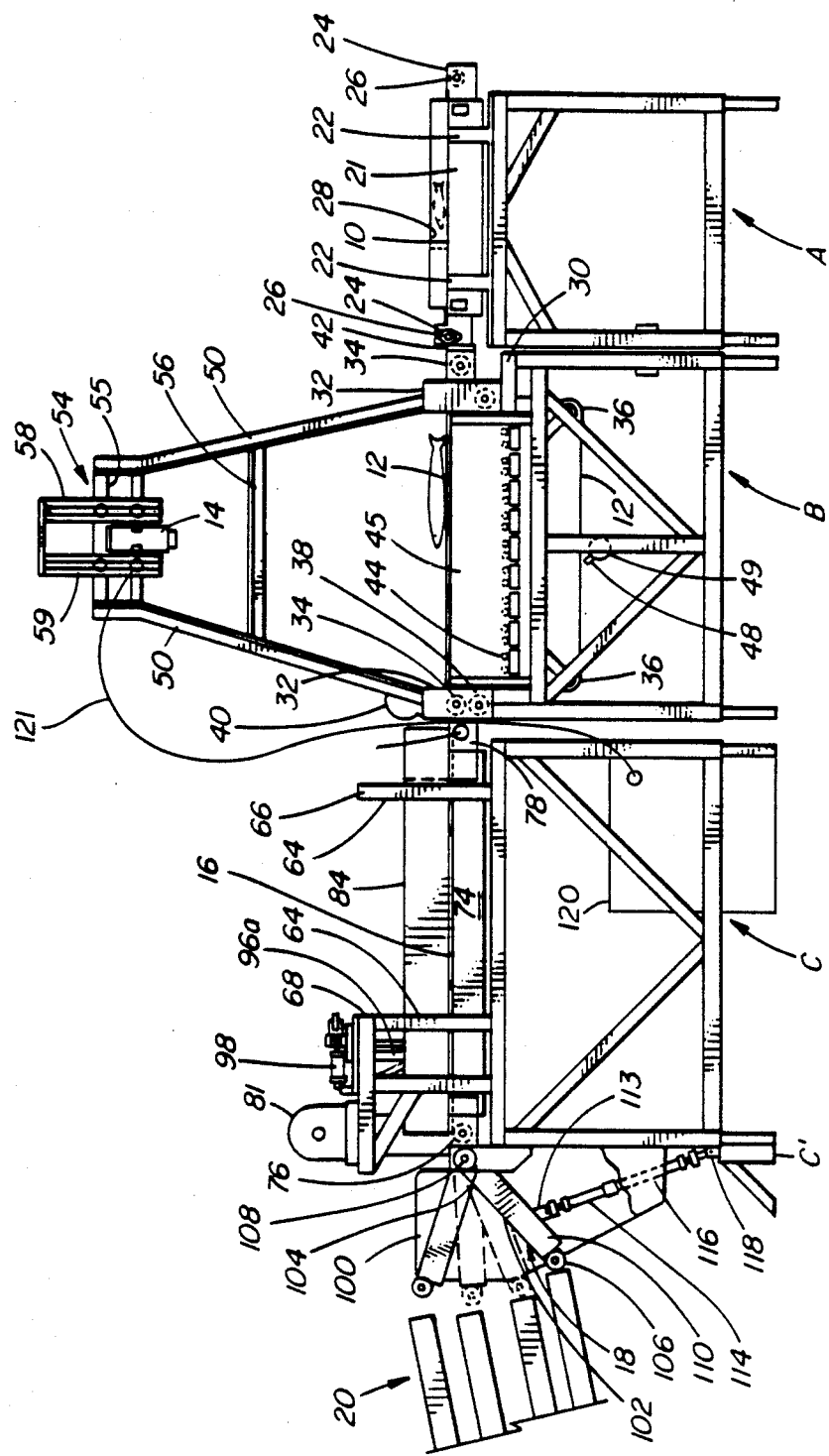
FIG. 1 is a side elevation of the whole apparatus.

As shown in the drawings, the apparatus has three main conveyor sections carried by three frames A, B and C. Frame A carries an infeed conveyor belt 10, frame B carries a viewing conveyor belt 12 with lighting means and with a video or T.V. type camera 14 for viewing fish on this belt; and frame C carries a sorting conveyor belt 16. Frame C also supports the inner ends of directional outlet conveyor belts 18 which are capable of directing the fish into receiving means 20 disposed at four different levels. These items will now be described in detail.

Figure 2:
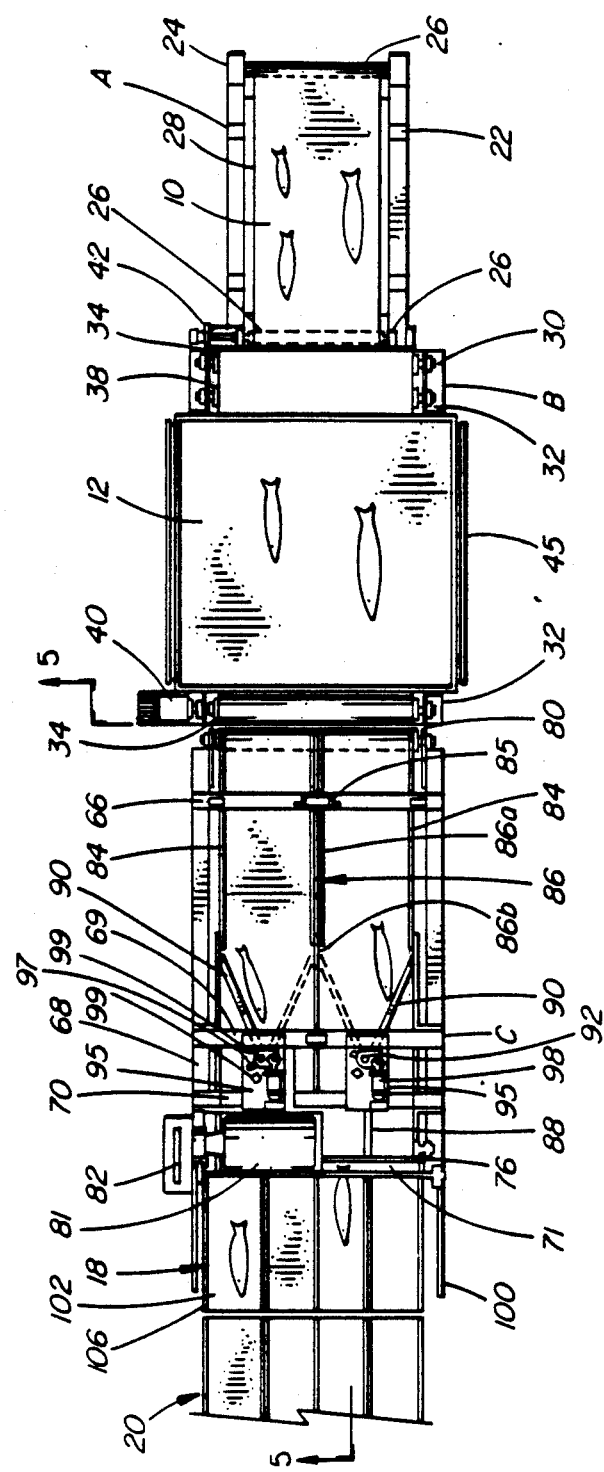
FIG. 2 is a plan view of the whole apparatus, but excluding the camera and supporting structure therefor.
Figure 4:
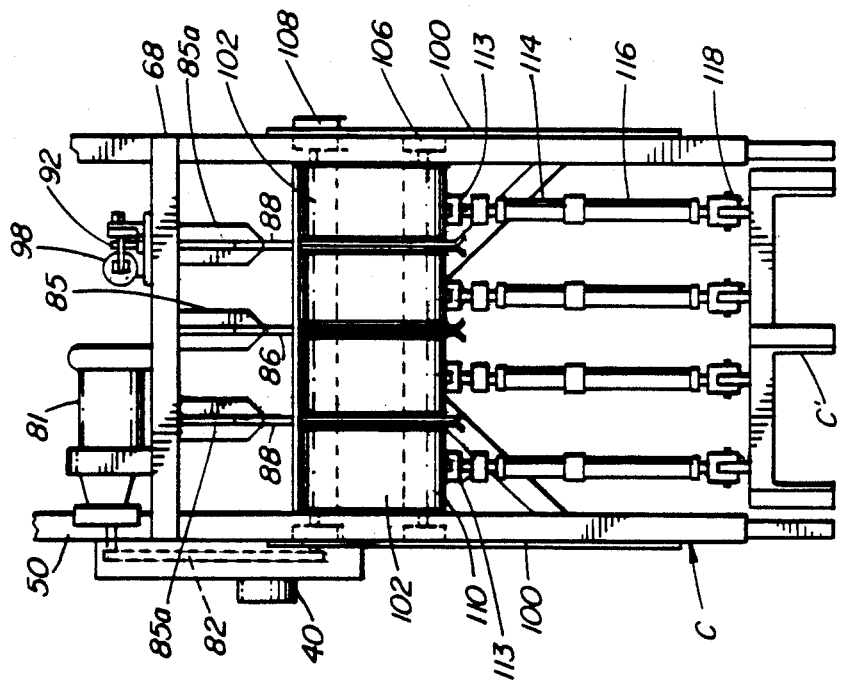
FIG. 4 is an end view of the apparatus on the outlet end also showing a part of the camera support.
Figure 3:
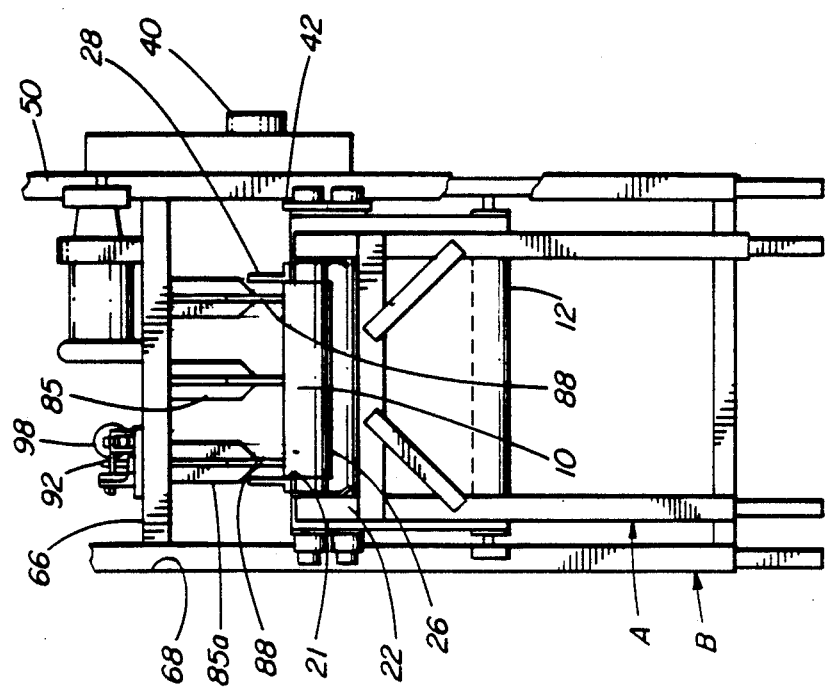
FIG. 3 is an end view of the apparatus on the infeed end, but showing a part only of the camera support.
Figure 5:
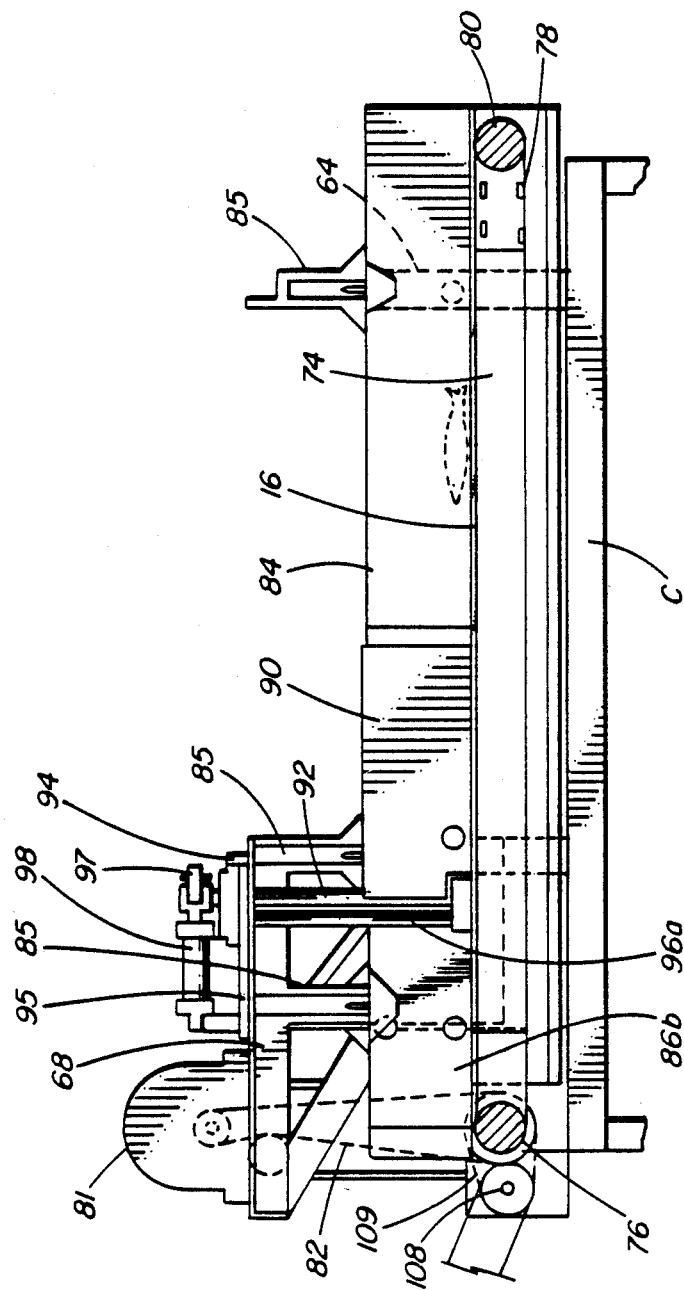
FIG. 5 is an enlarged, fragmentary view on lines 5—5 of FIG. 2.

The infeed conveyor shown in FIGS. 1, 2 and 3, comprises an inverted trough 21, the side flanges of which are supported by angle members 22 from the frame A. The ends of the flanges of trough 21 carry bearings 24 for transverse rollers 26 which carry between them the infeed conveyer belt 10 which slides on the top of trough 21 between two low side walls 28. The infeed belt is intended to receive fish, placed in two rows, in generally head to tail orientation, by two operators working one on each side of the frame A.

The frame A is clamped securely to frame B, which frame carries angle members 30 and 32 supporting various bearings which in turn carry rollers for the vision belt 12. These rollers include two top rollers 34, two bottom rollers 36, and intermediate tensioning rollers 38, with the belt passing outside rollers 34 and 36 and inside rollers 38. The rear end roller 34 is driven via sprocket chains from an electric motor 40 mounted above the end of this roller, and a further sprocket chain 42 is provided which connects the shaft of front end roller 34 with that of the rear roller of the infeed conveyor belt 10 in such manner that the vision belt travels faster than the infeed belt and ensures proper separation of fish even if placed fairly close together on the infeed belt.

Between the upper and lower runs of the viewing belt 12 there is provided a horizontal array of flourescent light tubes 44, a total of 18 florescent tubes being used each of 60 watt rating. This array is enclosed by side panels 45, shown partly broken away in FIG. 1. The belt is translucent so that a clear profile of the fish shows up when viewed from above the belt with the tubes lit. A suitable belt is made by Leder Inc. of Carmichaels, Pa., U.S.A. and sold under the trademark "Leder Rapptex" and designated "E120/20+02PU white". This is a belt having an upper surface formed of unwoven polyurethane reinforced by two layers of unwoven polyester fabric.

Beneath the lower run of the belt there is provided a row of nozzles 48 supplied from a water manifold 49. During operation of the apparatus these nozzles are supplied with water so as to continuously wash the outside of the belt, removing any particles which might interfere with viewing of the fish.

The camera 14 is mounted by means of an angle member superstructure including the inwardly sloping members 50 having their lower ends attached to frame parts 32, and the upper ends of which carry a frame-work 54 including horizontal angle members 55. Horizontal bracing parts 56 are also provided, and the whole structure is designed to minimize possible movement between the camera and the frame B. The camera itself is mounted by means of a frame 58, having slots 59 to allow its vertical adjustment relative to members 56, and having clamps for securing the camera 14. The camera is normally positioned so that it has a vertical axis roughly coincident with the centre of belt 12. The camera is capable of viewing the large majority at least of the vision belt and at least those areas of the belt which receive fish from each side of the infeed belt 10.

The sorting conveyor is shown in FIGS. 1,2, 4 and 5. The frame C which carries this conveyor is separate from and isolated from the frame B, i.e. there is no direct contact between structural parts connected to the frames B and C. The frame C carries vertical angle members 64, the front one of said members carrying a horizontal member 66 and a rear pair of said members carrying fore and aft angle members 68 and three cross members 69, 70 and 71. The members 64 also support an inverted trough having a flat top plate and down turned flanges 74 which are shown in FIG. 1. The rear of this trough carries bearings for a rear roller 76, and an extention 78 of the front of the trough carries bearings for a front roller 80, the two rollers 76 and 80 carrying the sorting conveyor belt 16 which slides on the top of the trough. This belt 16 is driven by motor 81 connected by sprocket chains 82 to rear roller 76.

The vertical angle members 64 also support vertical side walls 84 the lower edges of which are just above and inside the margins of the belt 16. These walls are formed of easily cleaned plastic material held onto members 64 with stainless steel screws. The cross members 66, 69 and 70, carry downwardly depending pairs of angle members 85 which are clamped onto and support a central partition 86, also having its lower edge supported just above the belt and formed of easily cleaned plastic. This partition has a relatively wide front portion 86a which steps down to a relatively narrow rear portion 86b; it divides the sorting belt into two main parallel channels.

The central rear cross member 70 also supports, by angle members 85a, two divider walls 88 which divide the two main channels of the sorting conveyor into four exit channels. Adjacent the front end of each divider wall 88 is provided a deflector plate 90 which is a rectangular, vertical plate having its rear end held by vertical shaft 92. Shaft 92 has its upper end rotatable in a bearing 94 supported by plate 95 held between the cross member 69 and 70, and has its lower end supported by a bearing fixed to a stationary shaft 96a carried by plate 95 just to the rear of shaft 92. The upper end of shaft 92 is connected by one end of crank member 97 to a pneumatic actuating cylinder 98 having its other end mounted on the rear of plate 95; movement of the crank is limited by adjustable stops 99, which interact with the opposite end of the crank member 97. Actuation of the respective cylinders 98 between their extreme positions causes the deflector plates 90 to move between the two positions indicated in FIG. 2, in which positions each plate can deflect fish on the sorting conveyor into one or other of the channels defined on opposite sides of respective wall 88. The front ends of the deflector plates 90 fit behind the steps formed by the overlapping material of walls 84 and partition 86 so that fish cannot become jammed at the front end of these deflector plates. Also, the deflector plates, in their extreme positions, form an angle of considerably less than 45°, preferably about 30°, with the axis of the sorting conveyor so that the fish are deflected by a gentle action which does not damage the fish even when the conveyor is operated at high speeds. The deflector plates are made of the same easily cleanable plastic material as is used for walls 84, 88 and partition 86.

The rear vertical members of frame C support two vertical plates 100 which enclose the four moveable outlet conveyors 18. Each of these moveable conveyors corresponds in width to one of the outlet channels from the sorting conveyor, and has a belt 102 held between a front roller 104 and a rear roller 106. The front rollers 104 are fixed on a common shaft 108 drivingly connected to roller 76 by sprocket means 109. The rear rollers 104 are supported by the flanges of channel members 110 shown in FIG. 4 which have their front ends pivotably mounted on bearings recessed within the ends of rollers 104 and interconnecting these roller ends to the flanges. The channel members have their upper web portions supporting the belts 102. The belt material has sufficient friction that fish can be carried up the belt at an angle of at least 20° to the horizontal.

The flanges of each channel 110 are connected together by an angle member which carries pivot means 113 for the end of the piston rod of a first, upper pneumatic cylinder 114. This cylinder has a stroke of about 6 inches. Its lower end is connected to the closed end of lower cylinder 116 which has a longer stroke, say 12 inches, i.e. so that the cylinders are aligned, back to back relation. The piston rod of lower cylinder rod 116 is connected by pivot means to a base mounting part 118 carried by a sub-frame C' at the rear end of frame C. The supply of air to the two cylinders can be controlled independently, so that the two cylinders can give four positions of elevation for each of the conveyors; i.e. a first position with both cylinders retracted, a second position with cylinder 116 retracted and cylinder 114 extended, a third position with cylinder 116 extended and cylinder 114 retracted, and a fourth position with both cylinders extended. These four positions are indicated in FIG. 1, and as shown they correspond to four receivers or destination chutes 20 which receive fish from each of the four moveable conveyors. Unlike movable chutes used in some prior art fish sorting machines, the conveyors 18 can deliver fish to points which are above the level of the sorting belt, allowing for good vertical separation of the four receivers.

It will be seen that fish received on each side of the sorting belt, in each of two rows separated by partition 86 can be diverted into one of two channels by the deflector plates 90, and subsequently the fish from each of the four channels can be sorted into the four receivers 20 by operation of the cylinders 114 and 116. Accordingly, fish at each side of the belt can be sorted into eight different receivers. The pneumatic cylinders 98, 114 and 116 are automatically controlled by electrical circuit means including a computer indicated at 120 in FIG. 1 and linked to the video camera 14 by a lead 121. In operation, fish are placed on the infeed belt 10 in two rows, one each side of the centre line, and then pass onto the vision conveyor 12. The higher speed of the vision conveyor tends to separate the fish and to ensure more or less head to tail arrangement on the vision conveyor. The computer circuitry is such as to receive an image of each of the fish, and to select for it one of eight categories according to pre-selected requirements of species or size. The computer may be arranged to convert the observed fish dimensions into a calculated weight of the fish so that fish can be categorized by weight. The computer is capable of making the required selections even though the fish may not be accurately disposed head to tail, and even though the fish may be curved. With a suitable time delay, the computer output provides signals to operate the pneumatic cylinders 98, 114 and 116 to ensure that each fish is directed to the proper receiver 20. It will be noted that the fish maintain their general direction of movement through the whole process, without abrupt changes in direction or orientation, and this allows the process to be operated at fairly rapid speeds without causing damage to the fish. Preferably, a speed of about 120 ft/min. is used for the feed belt, and a speed of about 190 feet per minute is used for the vision, sorting and outlet conveyors.

I claim:

1. Fish sorting apparatus comprising:
   a lighted viewing conveyor belt arranged to receive fish seriatim;
   a video camera mounted above said viewing belt and directed downwardly to receive images of individual fish on said viewing belt;
   a sorting conveyor belt having a front end thereof arranged rearwardly of said viewing belt to receive fish from said viewing belt, said sorting conveyor belt having a rear exit portion;
   a divider wall above said sorting conveyor belt which extends parallel to the axis thereof and which has a front end thereof spaced rearwardly of said front end of the sorting conveyor belt, and which divides said rear, exit portion into separate channels;
   movable deflector means mounted at the front end of said divider wall for deflecting fish on said sorting conveyor belt into one or other of said channels;
   an actuator for moving said deflector means between two extreme positions in each of which positions the deflector means forms an angle of less than 45 degrees with the axis of the sorting conveyor belt;
   an outlet conveyor belt for conveying said fish from each of said channels into separate receiving means, said outlet conveyor belts and said channels and deflector means being arranged to direct the fish along a generally constant direction and avoiding substantial re-orientation and abrupt path changes; and
   electronic circuit means connecting said actuator to said video camera whereby said actuator means controls the deflection of fish into one or other of said channels depending on the image of the fish received by the camera; and
   wherein each outlet conveyor belt is pivotable about a horizontal axis at an inlet end thereof, and wherein actuating means is provided for moving each outlet conveyor belt between several different positions to deliver fish from each channel into receiving means at several different levels, said actuating means being controlled by said electronic circuit means so that fish are selectively delivered to said different receiving means.

2. Fish sorting apparatus according to claim 1, wherein each said outlet conveyor belt actuating means includes two fluid operated cylinders mounted in series, said cylinders having different strokes so that each said outlet conveyor belt is movable by said cylinders between a first position by retraction of both cylinders, second and third positions by extension of one cylinder and retraction of the other, and a fourth position by extension of both cylinders.

3. Fish sorting apparatus according to claim 2, wherein said fluid operated cylinders of each outlet conveyor belt actuating end to end, the piston rod of a first of said cylinders being connected to a stationary frame part and the piston rod of the other cylinder being connected to means movable with said outlet conveyor belt.

4. Fish sorting apparatus according to claim 1 wherein said viewing conveyor belt and said video camera are mounted on a frame isolated from another frame which carries said sorting conveyor and said actuator, to substantially prevent vibrations caused by said actuator from reaching the camera.

5. Fish sorting apparatus including:
   a lighted viewing conveyor belt arranged to receive fish seriatim;
   a video camera mounted above said viewing belt and directed downwardly to receive images of individual fish on said belt;
   sorting belt means which includes at least one outlet conveyor belt which receives fish after having left the viewing belt, said outlet conveyor belt being pivotable about a horizontal axis at its inlet end and having actuating means whereby it is movable between four different levels to deliver fish to four different receiving means which are separated vertically;

electronic circuit means connecting said actuating means to said video camera whereby said actuating means causes the outlet conveyor belt to direct a fish into a selected one of said receiving means according to the image of the fish received by the video camera;

wherein said actuating means for each outlet conveyor belt includes two fluid operated cylinders mounted in series, said cylinders having different strokes so that each said outlet conveyor belt is movable between a first position by retraction of both cylinders, second and third positions by extension of one cylinder and retraction of the other cylinder, and a fourth position by extension of both cylinders.

6. Fish sorting apparatus according to claim 5, wherein said fluid operated cylinders of each outlet conveyor belt actuating means have their cylinder ends connected rigidly together end to end, the piston rod of a first of said cylinders being connected to a stationary frame part and the piston rod of the other cylinder being connected to means movable with said outlet conveyor belt.

7. Fish sorting apparatus comprising:
a viewing conveyor belt which is translucent and has an upper run passing over an array of florescent tubes and a lower run passing under said array;
a video camera mounted above said viewing belt and directed downwardly to view individual fish on said viewing belt, said camera having a field of view occupying at least a major part of the upper run of the viewing belt;
a second, sorting conveyor belt arranged to receive fish from the viewing belt;
the sorting belt being associated with means for directing the fish into several different receiving means, said means for directing being connected to electronic circuit means in turn connected to said video camera so that the fish are directed into said receiving means depending on images of fish received by the video camera;
a feed belt arranged to deliver fish to the viewing belt; and
means drivingly connecting the feed belt to the viewing belt so that the viewing belt has a higher surface speed than the feed belt;
wherein each side of the feed belt is accessible by an operator so that two operators can place fish on opposite sides of the feed belt in separate rows, the sorting conveyor belt having a central partition which prevents mixing of the fish received from the separate rows, the field of view of the video camera including both rows of fish on the viewing conveyor belt, the circuit means being arranged to operate said directing means to the fish from each row independently of the other row; and wherein two divider walls are provided above the sorting conveyor belt on opposite sides of said partition, each extending parallel to the sorting conveyor belt axis and which, together with the partition, divide the outlet end of the sorting conveyor belt into four channels.

8. Apparatus according to claim 7, wherein each of said channels communicates with a separate outlet conveyor belt, and wherein each outlet conveyor belt is provided with actuating means including two fluid operated cylinders, mounted in series, said cylinders having different strokes so that each outlet conveyor belt is movable between a first position by retraction of both cylinders, second and third positions by extension of one cylinder and retraction of the other, and a fourth position by extension of both cylinders, and allowing the fish from each of the four channels to be directed into four different receiving means.

9. Apparatus according to claim 7, wherein adjacent said lower run of the viewing conveyor belt there is provided an array of nozzles directed towards that belt, and means for supplying water thereto for maintaining the belt continuously clean during operation.

10. A process for sorting fish, comprising:
feeding fish seriatim onto a lighted, viewing conveyor belt, and obtaining an image of said fish with a video camera mounted above said viewing belt;
passing fish from said viewing belt to a sorting belt;
deflecting fish between separate parallel channels on the sorting belt by deflecting means inclined at an angle of less than 45 degrees to the path of movement of the fish;
conveying the fish from each said channel by outlet conveyor belts which are angularly movable to direct the fish to receiving means at different levels, and moving said deflecting means and said outlet conveyor belts by circuit means connected to the video camera so that fish are deflected into said receiving means according to their preselected characteristics as registered by the video camera, whereby said fish are sorted into said receiving means without substantial re-orientation or abrupt path changes.

* * * * *